United States Patent
Jun (10) Patent No.: US 7,366,257 B2
(45) Date of Patent: Apr. 29, 2008

(54) CARRIER RECOVERY DEVICE OF DIGITAL TV RECEIVER

(75) Inventor: Jung Sig Jun, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 808 days.

(21) Appl. No.: 10/751,251

(22) Filed: Dec. 30, 2003

(65) Prior Publication Data

US 2004/0165682 A1 Aug. 26, 2004

(30) Foreign Application Priority Data

Dec. 30, 2002 (KR) .................... 10-2002-0086868

(51) Int. Cl.
*H04L 27/00* (2006.01)
(52) U.S. Cl. ..................................... 375/326
(58) Field of Classification Search ............... 375/261, 375/270, 316, 326, 340, 350, 321; 329/304, 329/306, 307, 308, 357; 348/553, 725, 326, 348/726

See application file for complete search history.

(56) References Cited

U.S. PATENT DOCUMENTS

| | | | |
|---|---|---|---|
| 5,648,923 A * | 7/1997 | Lane et al. | 708/319 |
| 6,233,295 B1 * | 5/2001 | Wang | 375/364 |
| 2003/0058967 A1 * | 3/2003 | Lin et al. | 375/327 |
| 2003/0206052 A1 * | 11/2003 | Chiou | 329/304 |

FOREIGN PATENT DOCUMENTS

| KR | 100236043 B1 | 9/1999 |
|---|---|---|
| KR | 1020010076780 A | 8/2001 |

* cited by examiner

*Primary Examiner*—Sam K. Ahn
(74) *Attorney, Agent, or Firm*—Lee, Hong, Degerman, Kang & Schmadeka (57) ABSTRACT

A carrier recovery device of a digital TV receiver is disclosed, which can stand a multiple path noise. In the carrier recovery device, it is possible to recover a carrier with a phase error component of the carrier existing on data blocks as well as a carrier signal, whereby it has the carrier recovery function even in case a carrier recovery unit is not operated properly.

12 Claims, 6 Drawing Sheets

FIG. 4A
Prior Art phase 0°

FIG. 4B
Prior Art phase 180°

FIG. 5A
Prior Art phase 0°

FIG. 5B
Prior Art phase 180°

CARRIER RECOVERY DEVICE OF DIGITAL TV RECEIVER

This application claims the benefit of the Korean Application Nos. P2002-86868, filed on Dec. 30, 2002, which is hereby incorporated by reference.

BACKGROUND OF THE INVENTION

1. Field of the Invention

The present invention relates to a digital TV receiver, and more particularly, to a carrier recovery device of a digital TV receiver that can stand a multiple path noise.

2. Discussion of the Related Art

Recently, the VSB (Vestigial SideBand) system, employed as a broadcasting standard of a digital TV (hereinafter, DTV) in Korea and U.S.A. presently, is designed to transmit a broadcasting signal by using a frequency assigned to the existing analog TV broadcasting system. However, in order to minimize the influence on the existing analog TV broadcasting system, an intensity of a DTV signal is very low as compared to an intensity of an analog TV signal. Of course, the standard is determined such that there is no problem in reception of the DTV signal even if the intensity of the signal is low by using a variety of coding systems in the DTV signal and channel equalizers for reduction of the influence from a noise. However, if the signal cannot be received properly if a transmission channel condition is very poor.

In general, because the DTV transmission system has a merit in that you can watch a picture having no noise at all as noise occurred on the transmission channel is removed perfectly in reception of the broadcasting signal, but has a demerit in that you can not watch the picture at all if you can not recover the transmission signal fully, it is required that the receiver can receive all signals even if the signals have passed through any level of poor transmission channel.

Figure 1:
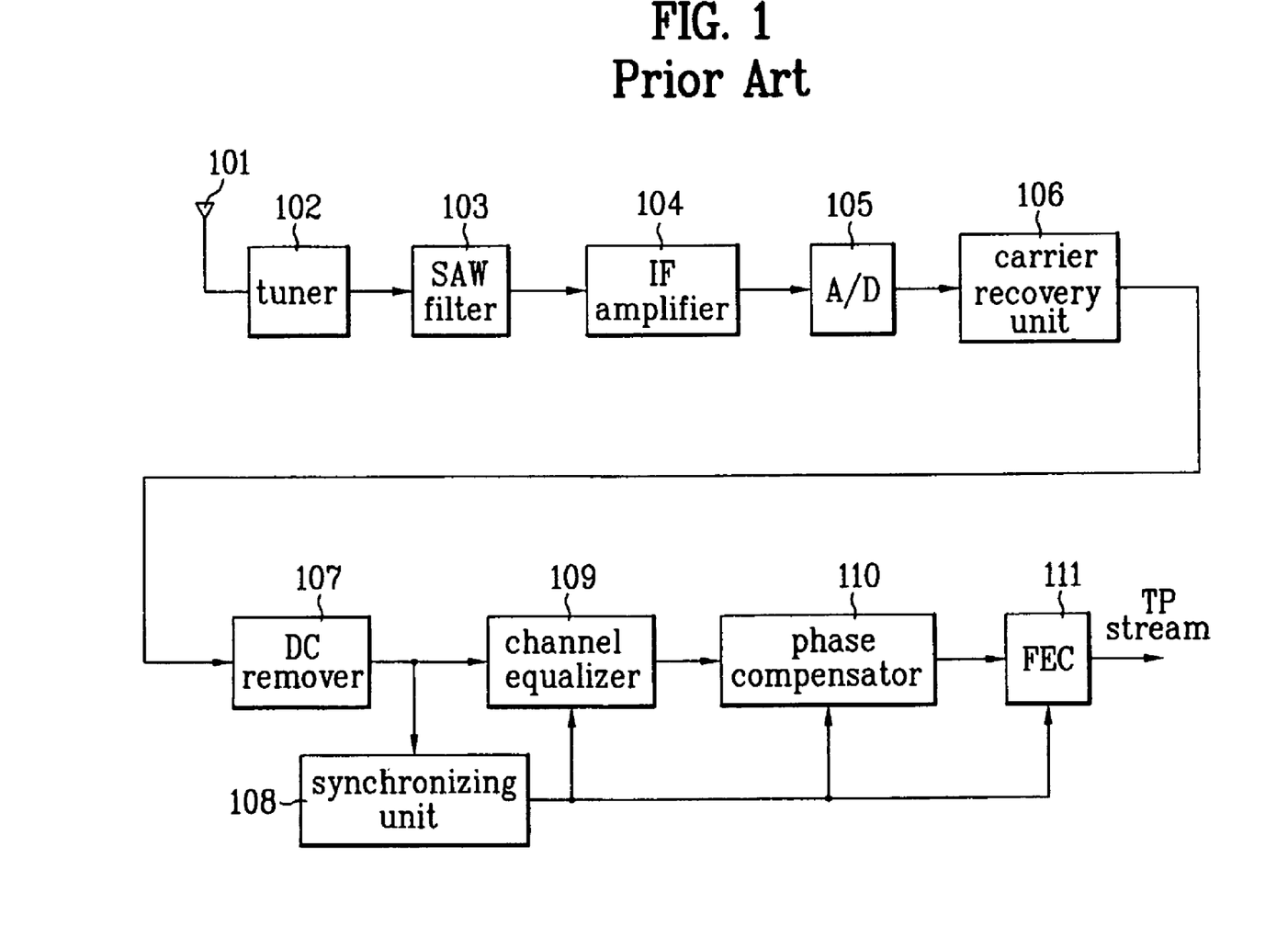
FIG. 1 is a block diagram illustrating a related art DTV receiver.

Hereinafter, the related art DTV receiver will be described with reference to the accompanying drawings. FIG. 1 is a block diagram illustrating the related art DTV receiver.

Referring to FIG. 1, the related art DTV receiver receives a Radio Frequency (RF) signal modulated in a VSB mode through an antenna 101. Then, a tuner 102 selects a particular channel frequency that a user desired, and then the tuner 102 transits a VSB signal of a RF band recorded in the particular channel frequency to an intermediate frequency band (IF; in case of 44 MHz or analog TV broadcasting system, 43.75 MHz is used generally), and filters the signals of the other channels properly.

Also, an output signal of the tuner 102, converting a spectrum of a predetermined channel to a passband signal of IF, passes through a Surface Acoustic Wave (SAW) filter 102 for removing peripheral channel signals and noise signals. For example, since a digital broadcasting signal has information between an intermediate frequency of 44 MHz and a band of 6 MHz, the SAW filter 103 removes all remaining blocks except the band of 6 MHz where information from the output of the tuner 102 exists, and outputs the result to an intermediate frequency amplifier 104.

The intermediate frequency amplifier 104 multiplies the signal outputted from the SAW filter 103 by a previously measured gain value so as to maintain the intensity of the signal outputted to an A/D converter 105 constantly. That is, to maintain the intensity of an input signal of the A/D converter 105 constantly, it is required to control the gain value of the input signal in the intermediate frequency amplifier 104. In this case, the information regarding the input signal may be directly extracted from an analog signal, or from a digital block at the rear of the A/D converter 105.

The signal inputted to the A/D converter 105 is a passband signal of 6 MHz. Accordingly, in the intermediate frequency amplifier 104, the gain value is controlled to maintain the constant intensity to all signals of 6 MHz inputted to the A/D converter 105. Thus, the A/D converter 105 receives and digitizes the signals having the constant intensity from the intermediate frequency amplifier 104. Then, the passband signal digitized in the A/D converter 105 is transit to a base band signal in a carrier recovery unit 106, and then the base band signal is outputted to a DC remover 107. At this time, a carrier signal used for recovering a carrier in the carrier recovery unit 106 is converted to a DC component having a frequency of 0 Hz after recovering the carrier.

That is, for recovering the carrier in the carrier recovery unit 106, the DC component is forcibly inserted into a transmitting signal in a transmitting unit. In this respect, the DC component is not required after recovering the carrier. Accordingly, the DC remover 107 extracts and removes the DC component from the base band signal outputted from the carrier recovery unit 106. Then, the digital signal of the base band having no DC component therein is outputted to a synchronizing unit 108 and a channel equalizer 109.

Generally, noticeable features of the VSB transmission system suggested from Grand Alliances (GA) compared to other DTV transmission systems are a pilot signal, a data segment synchronizing signal, a data segment synchronizing signal, and a field synchronizing signal. Those signals are transmitted from the transmitting unit for improving characteristics of carrier recovery, timing recovery, and the like.

Accordingly, the synchronizing unit 108 restores the data segment synchronizing signal and the field synchronizing signal, which are inserted during transmitting, from the signal having no DC component therein. The restored signals are outputted to the channel equalizer 109, a phase compensator 110, and an FEC (forward error correcting) unit 111.

The channel equalizer 109 removes a linear distortion of amplitude generating interference between symbols, and ghost generated by reflection on building or mountains, and then outputs the result to the phase compensator 110. After that, the phase compensator 110 removes the residual phase noise generated in the tuner 102 from the output signal of the channel equalizer 109, and then outputs the result to the FEC unit 111. Then, the FEC unit 111 restores the transmitting symbol from the receiving signal having no phase noise by using the synchronizing signals, and then outputs the result as a transporting stream type.

At this time, as shown in FIG. 1, the signal completing the analog process is converted to the digital signal in the A/D converter 105, and then is outputted to the carrier recovery unit 106. Thus, in case the carrier is not recovered in the carrier recovery unit 106, the digital blocks provided at the rear of the carrier recovery unit 106 are not operated properly.

Figure 2:
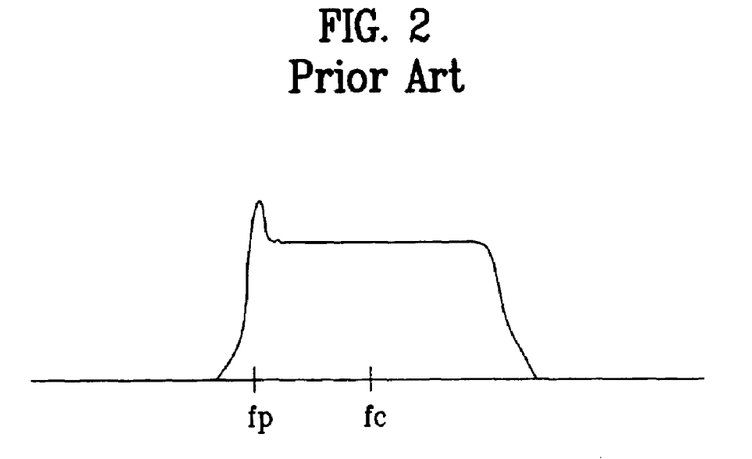
FIG. 2 is a spectrum illustrating frequency characteristics of a general air signal.

FIG. 2 is a spectrum illustrating frequency characteristics of a general air signal. More particularly, FIG. 2 illustrates frequency characteristics of an air signal defined according to the DTV broadcasting standard of Korea and U.S.A. presently. At this time, each channel has different center frequency (fc) and pilot frequency (fp). Herein, the center frequency is referred to as fc, and the pilot frequency is referred to as fp.

Generally, in case of a bandwidth in each terrestrial channel, the center frequency (fc) is the most intermediate frequency of 6M Hz, and the pilot frequency (fp) is the frequency where the carrier signal exists on the transmitting signal. At this time, the term of the pilot frequency is used instead of the carrier since the intensity of the carrier signal is decreased greatly (about 13 dB) and then is transmitted so as to prevent the influence of the DTV signal on the existing analog TV signal. Accordingly, in the carrier recovery unit 106 of the DTV receiver, the location of the pilot frequency (fp) existing on the frequency of the transmitting signal is correctly restored, and then is converted to the base band signal.

Figure 3:
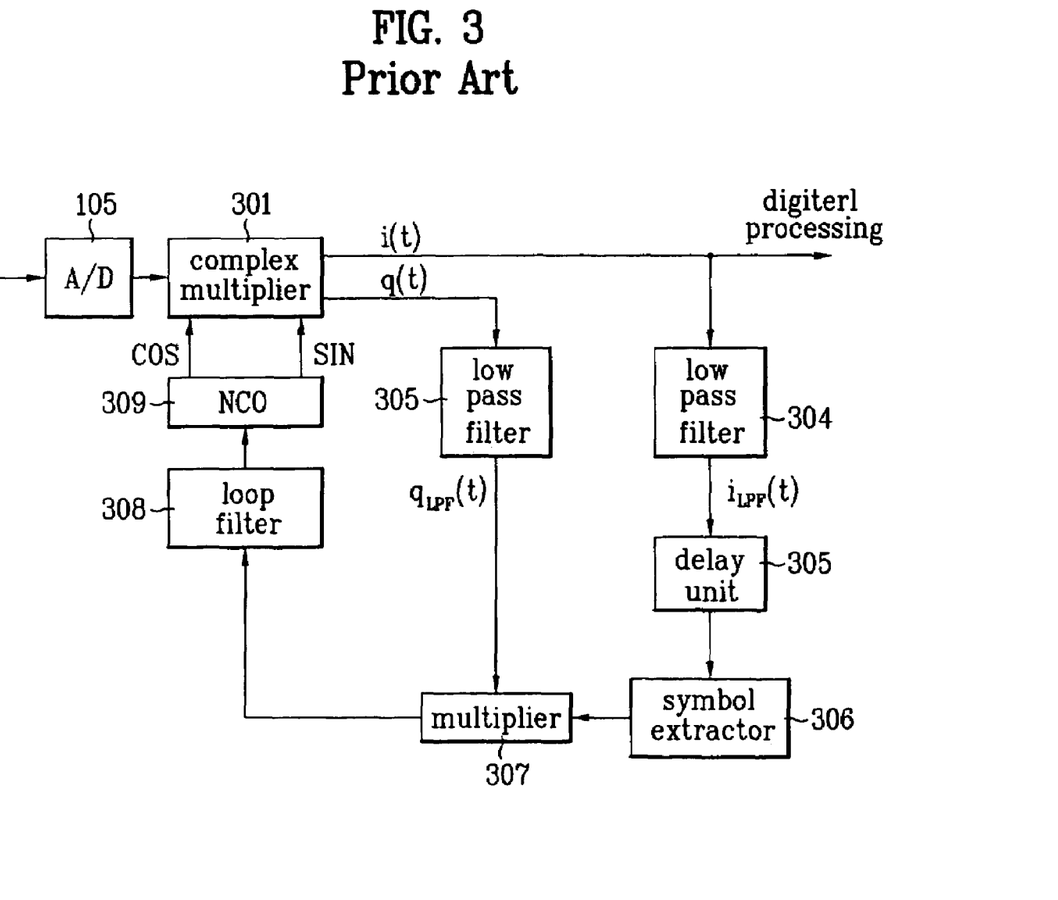
FIG. 3 is a detailed view illustrating a carrier recovery unit of FIG. 1.

As shown in FIG. 3, the most general algorithm of the carrier recovery unit 106 is a Frequency Phase Locked Loop (FLPP), fabrication of which circuit is simple and has an excellent performance to use widely. That is, the carrier recovery unit 106 of the FFLL demodulates I, Q signals of the passband from the A/D converter 105 into I, Q signals of the baseband, and then locks a frequency and a phase.

Hereinafter, the carrier recovery unit 106 of the DTV receiver will be described in more detail. FIG. 3 is a detailed view illustrating the carrier recovery unit of FIG. 1.

Referring to FIG. 3, I, Q signals of the passband digitized in the A/D converter 105 are inputted to a complex multiplier 301. The complex multiplier 301 receives a complex carrier of sine wave and cosine wave, in which the carrier is recovered, through a Numerically Controlled Oscillator (NCO) 308, and then transits I, Q signals of the passband to I, Q signals of the base band by multiplying I, Q signals of the passband outputted through the A/D converter 105.

Then, I, Q signals of the base band are outputted to the DC remover 107. Simultaneously, I signal of the base band is outputted to a first low pass filter 302, and Q signal of the base band is outputted to a second low pass filter 303. At this time, the carrier recovery unit 106 requires only signals in the periphery of the frequency where the pilot frequency (fp) exists on a bandwidth of 6 MHz.

That is, in case of I, Q signals of the base band, the pilot signal is converted to the DC component. Particularly, the pilot signal is converted to the frequency component of the periphery of the DC component. This is generated according to the difference between the carrier frequency component of the input signal and the carrier frequency component generated in the NCO 308.

Accordingly, it is possible to recover the carrier by using the component existing in the periphery of the DC component. Also, the remaining data components except the signal component of the periphery of the DC component are removed in the first and second low pass filters 302 and 303 since it is possible to recover the carrier with the signal component of the periphery of the DC component. The output of the first low pass filter 302 is inputted to a delay unit 303. The delay unit 303 delays $I_{LPF}(t)$, I signal from which the data component is removed, for a predetermined time period, and outputs to a symbol extractor 304. In this case, if the pilot component is not correctly converted to the DC component when I signal of the pilot component outputted from the first low pass filter 302 passes through the delay unit 303, it generates a corresponding phase error.

Accordingly, the delay unit 303 converts the difference between the pilot frequency component of the input passband signal and the carrier frequency component of the NCO 308 to the phase error type, and then outputs the result to the symbol extractor 304. The symbol extractor 304 extracts only symbols of the signals outputted from the delay unit 303, and then outputs the extracted symbols to a multiplier 306. Then, the multiplier 306 multiplies the symbol of I signal by $q_{LPF}(t)$, Q signal from which the data component is removed, and then outputs the result of the phase error to a Loop filter 307. The Loop filter 307 filters and adds the phase error, and then outputs the result to the NCO 308. Then, the NCO 308 generates the complex carrier (COS, SIN) in proportion to the output of the Loop filter 307, and outputs the complex carrier to the complex multiplier 301. Accordingly, the complex carrier (COS, SIN) becomes the signal similar to the carrier frequency component of the input signal.

According to repetition of the aforementioned process, the complex carrier signal that is similar to the carrier frequency component of the input signal is generated in the NCO 308, and is outputted to the complex multiplier 301, whereby the complex multiplier 301 transits the signal of passband to the desired signal of base band. That is, if the pilot frequency, the carrier signal component that exists on the input passband, is correctly corresponding to the frequency component of the carrier signal generated in the NCO 308, the function of the carrier recovery unit 106 is completed.

In this case, the two carrier signals have the similar frequency components according to the environmental characteristics of the NCO 308 and the transmission line characteristics. However, the frequencies of the two carrier signals are not correctly corresponding to each other. Accordingly, the carrier recovery unit 106 changes the frequencies of the NCO 308 by compensating the frequency components that are not corresponding to each other, whereby the frequencies of the two carrier signals are corresponding to each other.

If the input signal has no linear noise, the capacity of data and the relative intensity of the pilot signal are constant, whereby it has no influence on the carrier recovery unit 106. However, if there is the linear noise in the input signal, the capacity of data and the relative intensity of the pilot signal are changed according to the delay time of the linear noise and the phase difference.

Figure 4A:
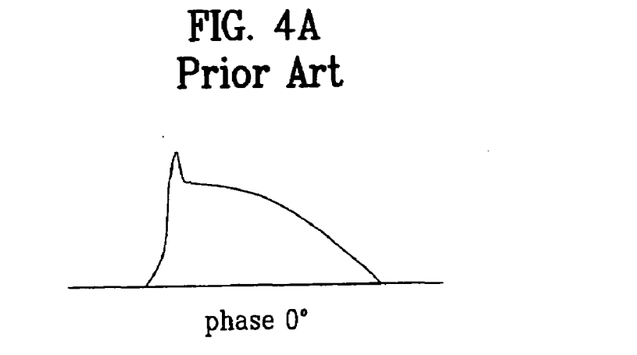
FIG. 4A and FIG. 4B are spectrums illustrating frequency characteristics of an air signal in case there is a linear noise of 1 symbol delay.
Figure 4B:
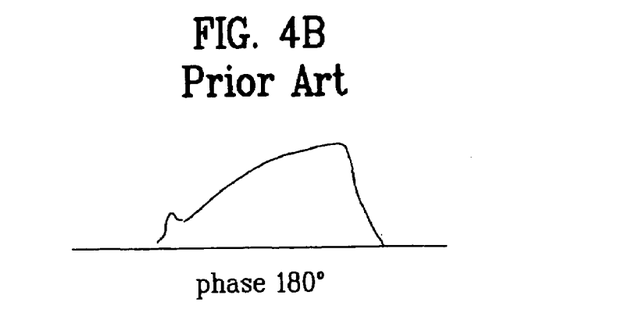

FIG. 4A illustrates the shape of the passband frequency in case the delay time of the noise is corresponding to 1 symbol block when the phase difference is 0°, and FIG. 4B illustrates the shape of the passband frequency in case the delay time of the noise is corresponding to 1 symbol block when the phase difference is 180°. By comparison to the frequency characteristics of FIG. 2, in case of FIG. 4A, the intensity of the pilot signal is relatively greater than the capacity of data. Meanwhile, in case of FIG. 4B, the intensity of the pilot signal is relatively smaller than the capacity of data.

Figure 5A:
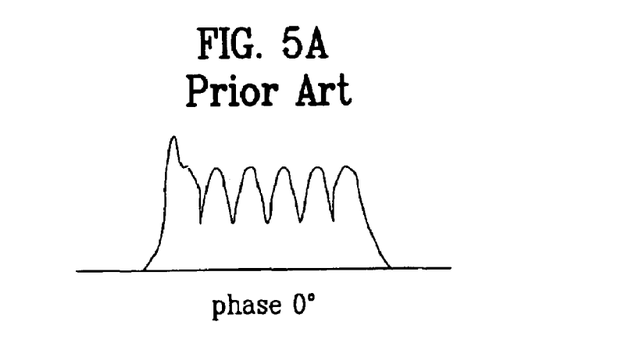
FIG. 5A and FIG. 5B are spectrums illustrating frequency characteristics of an air signal in case there is a linear noise of 10 symbol delay.
Figure 5B:
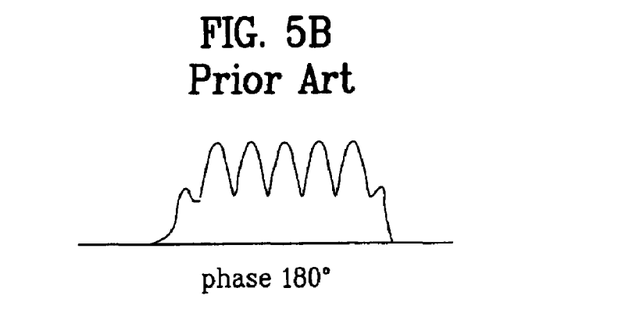

FIG. 5A illustrates the shape of the passband frequency in case the delay time of the noise is corresponding to 10 symbol block when the phase difference is 0°, and FIG. 5B illustrates the shape of the passband frequency in case the delay time of the noise is corresponding to 10 symbol block when the phase difference is 180°. In case of FIG. 5A, the intensity of the pilot signal is relatively greater than the capacity of data. Meanwhile, in case of FIG. 5B, the intensity of the pilot signal is relatively smaller than the capacity of data.

In case of FIG. 4B and FIG. 5B, the intensity of the pilot signal is small, whereby it is impossible to recover the carrier correctly since the information for carrier recovery is lost.

Accordingly, the related art carrier recovery device of the DTV receiver has the following disadvantages.

In the related art carrier recovery device, the intensity of the pilot signal is small, whereby it is impossible to recover the carrier correctly since the information for carrier recovery is lost. In this case, if the intensity of the input signal of the A/D converter 105 increases, it may generate the problem of deteriorating the function of another digital processor.

Also, in case the linear noise exists on the receiving signal, the frequency signal where the carrier signal component exists may be lost. In this case, it is impossible to use a carrier demodulator operated by extracting the frequency component where the carrier signal exists. Thus, the signal completing the analog process is linearly converted to the digital signal in the A/D converter 105, and then the converted digital signal passes through the carrier demodulator. In this respect, the digital signal processor is not operated properly since the carrier is recovered.

SUMMARY OF THE INVENTION

Accordingly, the present invention is directed to a carrier recovery device that substantially obviates one or more problems due to limitations and disadvantages of the related art.

An object of the present invention is to provide a carrier recovery device for recovering a carrier by using an existing carrier signal and all receiving data signals even in case a frequency component corresponding to a carrier signal component is completely lost in a receiving signal due to a linear noise.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a carrier recovery device of a digital TV receiver includes an A/D converter converting an analog signal to a digital signal by using a fixed frequency; a phase splitter splitting the digital signal to a real signal and a quadrature signal; a first complex multiplier outputting a real base band signal i(t) and a quadrature base band signal q(t) by performing a complex multiplying of the real and quadrature signals of the split passband and a first complex carrier outputted from a first NCO; a second complex multiplier outputting Like Offset QAM signals i'(t) and q'(t) by performing a complex multiplying of the real and quadrature base band signals i(t) and q(t) and a second complex carrier outputted from a second NCO; a phase error detector detecting a phase error to a particular multiple of a fixed frequency on basis of the Like Offset QAM signals i'(t) and q'(t); and a Loop filter low-pass filtering the phase error, and outputting the filtered phase error to the first NCO.

At this time, the phase error detector includes first and second squarers receiving the Like Offset QAM signals i'(t) and q'(t), and performing a nonlinear operation; a subtractor receiving output signals from the first and second squarers, and performing a subtraction operation; a passband filter extracting components corresponding to a carrier frequency from the signals outputted from the subtractor; and a Gardner phase error detector detecting the phase error between the filtered signal and a particular multiple of the fixed frequency.

Also, the phase error detector includes first and second absolute value calculators receiving the Like Offset QAM signals, i'(t) and q'(t), and calculating absolute values thereof; a subtractor receiving outputs of the first and second absolute value calculators, and performing a subtract operation; a passband filter receiving the signals from the subtractor, and extracting components corresponding to a carrier frequency therefrom; and a Gardner phase error detector detecting a phase error between the filtered signal and a, particular multiple of the fixed frequency.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a carrier recovery device of a DTV receiver according to the present invention will be described with reference to the accompanying drawings.

First Embodiment

Generally, in case a frequency signal where a carrier signal exists is lost completely since there is a linear noise in a receiving signal, it is impossible to use a pilot signal that is a carrier signal inserted in a transmitting unit during transmitting a broadcasting signal for recovering a carrier.

Accordingly, in another digital transmission mode receiving and transmitting the broadcasting signal without insertion of the carrier signal during transmitting the broadcasting signal, it is possible to recover the carrier by using a carrier recovery algorithm used in, for example, Quadrature Amplitude Modulation (QAM) system.

In the digital transmission mode using the QAM system, the carrier is recovered in a method of extracting frequency of the carrier signal and phase error from all data of the receiving signal since there is no carrier signal in the receiving signal. By comparison to a method for recovering the carrier from all receiving signals, a VSB method where the carrier signal exists on the receiving signal has greater efficiency of a carrier recovery unit. However, in case the carrier signal is lost due to ghost on a transmission channel, it is impossible to recover the carrier.

Thus, the present invention simultaneously uses the carrier signal existing on the receiving signal, and all data signals so as to recover the carrier. That is, in the carrier recovery device according to the present invention, even though there is ghost on the transmission channel due to multiple paths, it is possible to recover the carrier, thereby improving efficiency of the DTV receiver.

In the carrier recovery device according to the present invention, the carrier is recovered by using symbol timing recovery algorithm and nonlinear processing QAM and Gardner methods. Furthermore, in the carrier recovery device according to the present invention, an analog signal is converted to a digital signal by using a fixed oscillator.

Figure 6:
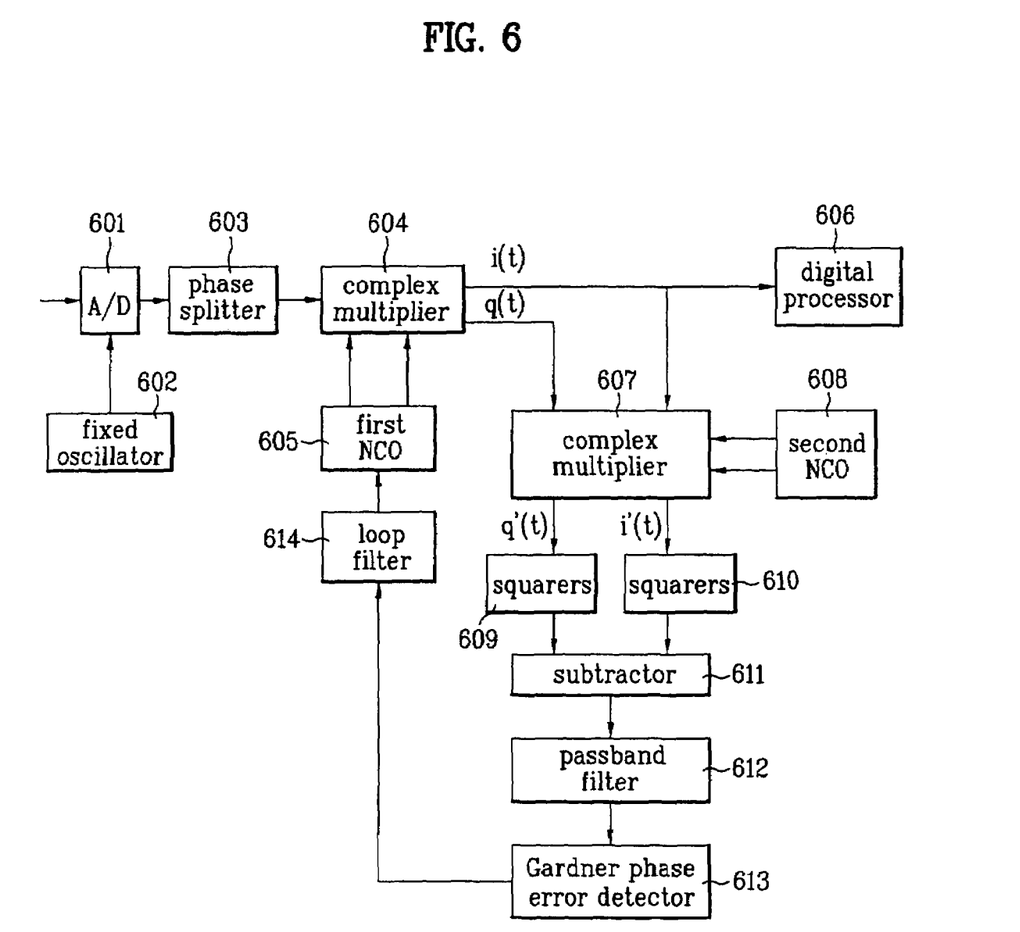
FIG. 6 is a block diagram illustrating a carrier recovery unit according to the first embodiment of the present invention.

FIG. 6 is a block diagram illustrating a carrier recovery device according to the first embodiment of the present invention. Referring to FIG. 6, the carrier recovery device according to the first embodiment of the present invention includes an A/D converter 601, a phase splitter 603, a first complex multiplier 604, a second complex multiplier 607, first and second squarers 609 and 610, a subtractor 611, a passband filter 612, a Gardner phase error detector 613, and a Loop filter 614.

At this time, the A/D converter 601 converts an analog passband signal to a digital passband signal by using a fixed frequency of a fixed oscillator 602, and the phase splitter 603 splits the digital passband signal in a real signal and a quadrature signal. Also, the first complex multiplier 604 outputs a real base band signal i(t) and a quadrature base band signal q(t) by performing a complex multiplying of the real and quadrature signals of the split passband and a complex carrier outputted from a first NCO (Numerically Controlled Oscillator) 605. Then, the second complex multiplier 607 outputs Like Offset QAM signals i'(t) and q'(t) by performing a complex multiplying of the real and quadrature base band signals i(t) and q(t) and a complex carrier outputted from a second NCO 608. The first and second squarers 609 and 610 receive the Like Offset QAM signals i'(t) and q'(t), and perform a nonlinear operation. Also, the subtractor 611 receives the signals outputted from the first and second squarers 609 and 610, and performs a subtract operation. Then, the passband filter 612 extracts components corresponding to a carrier frequency from the signals outputted from the subtractor 611, and the Gardner phase error detector 613 detects a phase error between the filtered signal and a particular multiple of a fixed frequency. Also, the Loop filter 614 low-pass filters and outputs the phase error to the first NCO 605 for carrier recovery.

The carrier recovery device according to the first embodiment of the present invention will be described with reference to the accompanying drawings.

First, the A/D converter 601 converts the analog passband signal to the digital passband signal by using the fixed frequency of the fixed oscillator 602. Also, the phase splitter 603 splits the digital passband signal in the real signal and the quadrature signal. Then, the first complex multiplier 604 outputs the two base band signals, {i(t), q(t)}, by performing the complex multiplying of the real and quadrature signals of the passband and the complex carrier in proportion to the phase error outputted from the first NCO 605. After that, the real base band signal, i(t), is outputted to a digital processor 606 and the second complex multiplier 607, and the quadrature base band signal, q(t), is outputted to the second complex multiplier 607.

The second complex multiplier 607 transforms the real and quadrature base band signals, i(t) and q(t), outputted from the first complex multiplier 604, to the Like Offset QAM signals i'(t) and q'(t) that are new pass band signals, by the output signal of the second NCO 608. At this time, the new pass band signal outputted from second complex multiplier 607 has a pilot frequency located at a frequency band of ⅛ as compared to an output frequency of the fixed oscillator 602.

If the fixed frequency of the fixed oscillator 602 is twice a symbol clock frequency, the two output signals of the second complex multiplier 607 have the same type as the Offset QAM signal. However, when the analog signal is transformed to the digital signal by using the fixed oscillator, it is required to use the fixed oscillator having the output frequency twice the symbol clock frequency, whereby the new passband signal, the output of the second complex multiplier 607, is very similar to the Offset QAM signal even though the new passband signal it not the Offset QAM signal. Accordingly, it is referred to as the Like Offset QAM signal.

Also, a control signal inputted to the second NCO 608 is maintained at "0" so as to prevent the additional phase error. That is, the second NCO 608 functions as a digital oscillator generating the frequency of the same type as the Offset QAM signal without reception of the control signal from the external.

Meanwhile, the first and second squarers 609 and 610 nonlinearly operates the real and quadrature Like Offset QAM signals outputted from the second complex multiplier 607, and the subtractor 611 performs the subtract operation of the output signals of the first and second squarers 609 and 610. In this case, in the output signal of the subtractor 611, the frequency of the carrier signal component inputted to the first and second squarers 609 and 610 is converted to the frequency corresponding to ¼ of the output frequency of the fixed oscillator 602. Also, the signals provided in the periphery of the carrier are converted to have the frequency corresponding to ¼ of the output frequency of the fixed oscillator.

Figure 7:
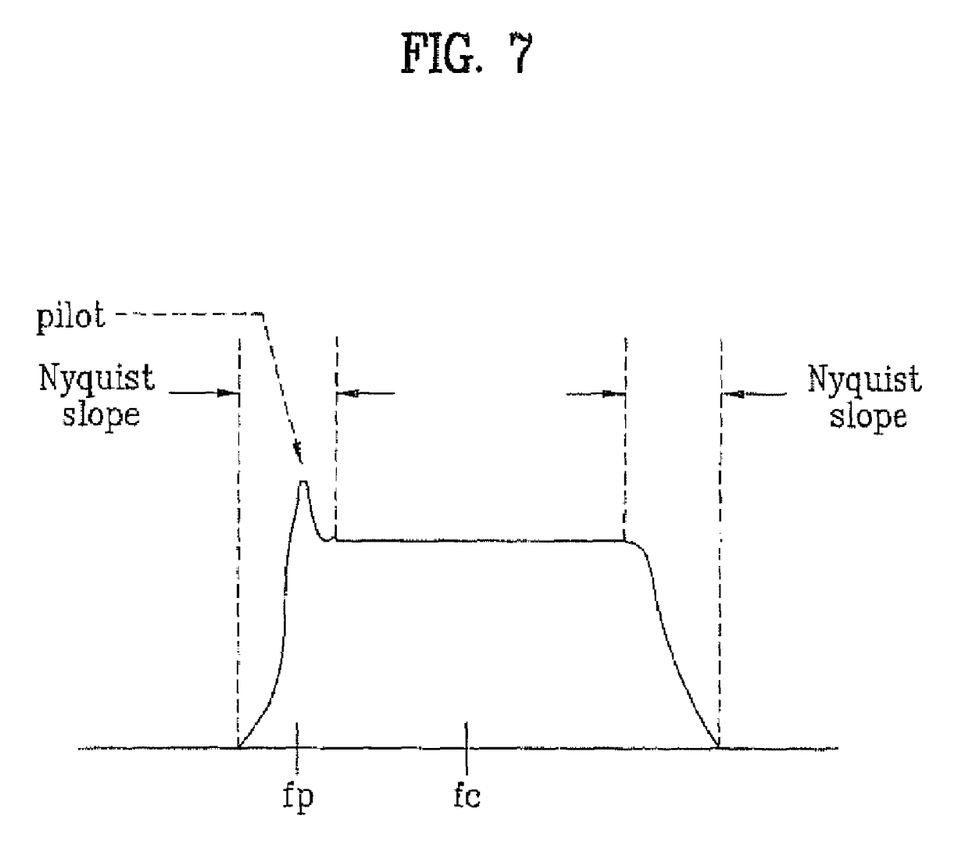
FIG. 7 is a spectrum illustrating a pilot signal and Nyquist slope characteristics.

At this time, as shown in FIG. 7, all signals provided in the periphery of the carrier are not converted to have the frequency corresponding to ¼ of the output frequency of the fixed oscillator 602. That is, only signal components corresponding to Nyquist Slope are converted. At this time, the Nyquist Slope is determined according to the capacity of data to transmit and the bandwidth of the signal used during transmitting the data.

After that, the passband filter 612 extracts the components corresponding to the carrier frequency from the output of the subtractor 611, and the Gardner phase error detector 613 detects the phase error from the frequency signal corresponding to ¼ of the output frequency of the fixed oscillator 602. Then, the Loop filter 614 low-pass filters the output of the Gardner phase error detector 613, and then outputs the filtered output to the first NCO 605 for carrier recovery.

Second Embodiment

In the first embodiment of the present invention, the Like Offset QAM method is used to use the Gardner type symbol timing recovery algorithm for carrier recovery. Also, even though the carrier signal is lost completely, it is possible to recover the carrier with the squarers that are nonlinear operators.

In addition, the signals existing on the Nyquist Slope in the periphery of the carrier signal are used to recover the carrier. That is, even though there is no carrier signal component in the receiving signal due to the linear noise, it is possible to recover the carrier. However, if both the carrier signal and the signal component existing on the Nyquist Slope are lost due to the linear noise on the transmission channel, it is impossible to recover the carrier. Thus, a carrier recovery device according to the second embodiment of the present invention is designed to recover the carrier even in case the carrier signal and the signal component existing on the Nyquist Slope are lost.

Figure 8:
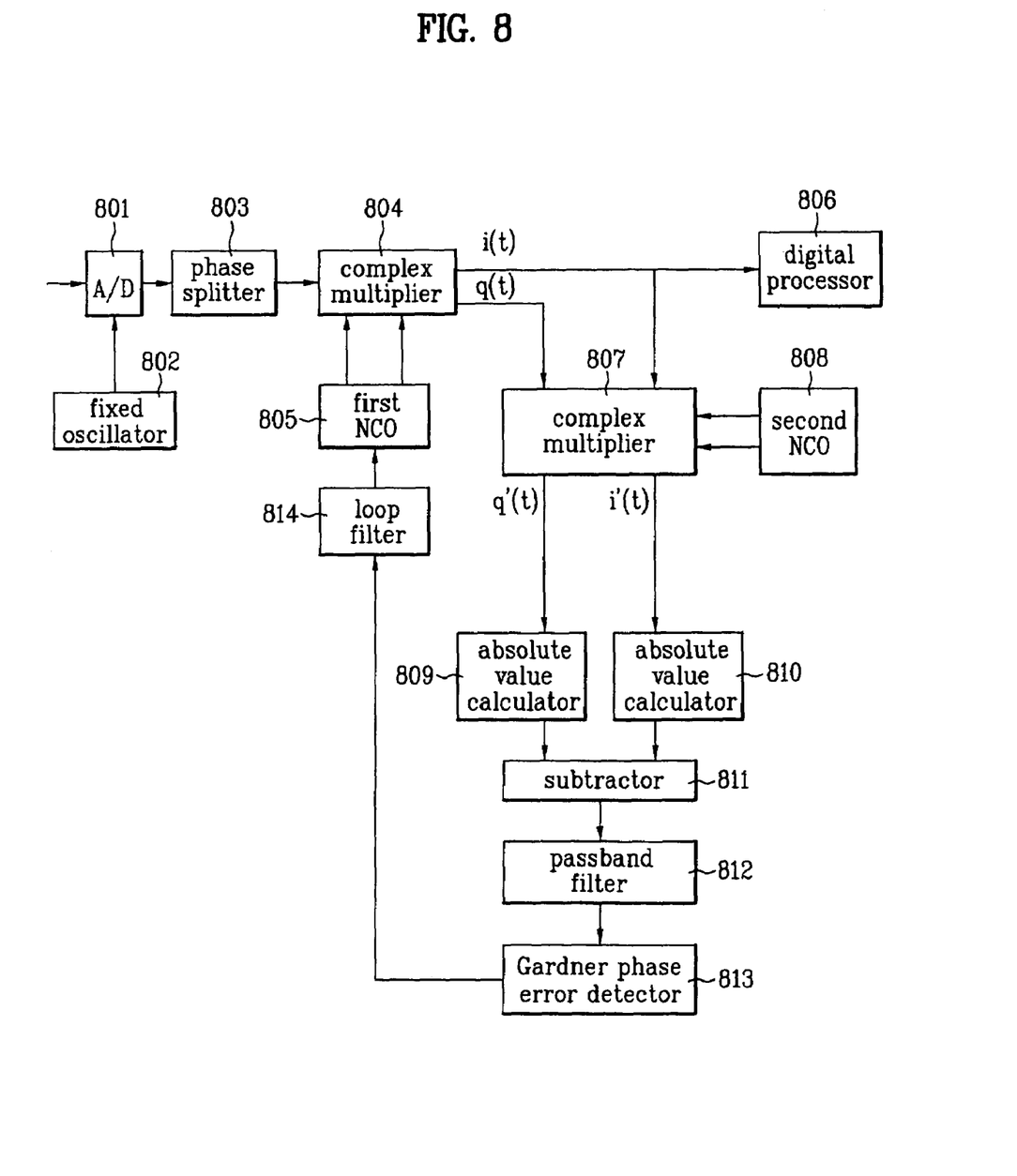
FIG. 8 is a block diagram illustrating a carrier recovery unit according to the second embodiment of the present invention.

FIG. 8 is a block diagram illustrating the carrier recovery device according to the second embodiment of the present invention.

As shown in FIG. 8, the carrier recovery device according to the second embodiment of the present invention includes an A/D converter 801, a phase splitter 803, a first complex multiplier 804, a second complex multiplier 807, first and second absolute value calculators 809 and 810, a subtractor 811, a passband filter 812, a Gardner phase error detector 813, and a Loop filter 814.

At this time, the A/D converter 801 converts an analog passband signal to a digital passband signal by using a fixed frequency of a fixed oscillator 802, and the phase splitter 803 splits the digital passband signal in a real signal and a quadrature signal. Then, the first complex multiplier 804 outputs a real base band signal i(t) and a quadrature base band signal q(t) by performing a complex multiplying of the real and quadrature signals of the split passband and a complex carrier outputted from a first NCO (Numerically Controlled Oscillator) 805. The second complex multiplier 807 outputs Like Offset QAM signals i'(t) and q'(t) by performing a complex multiplying of the real and quadrature base band signals i(t) and q(t) and a complex carrier outputted from a second NCO 808. Also, the first and second absolute value calculators 809 and 810 receive the Like Offset QAM signals, i'(t) and q'(t), and calculate absolute values thereof. Then, the subtractor 811 receives the outputs of the first and second absolute value calculators 809 and 810, and performs a subtract operation. Also, the passband filter 812 receives the signals from the subtractor 811, and extracts components corresponding to a carrier frequency therefrom. The Gardner phase error detector 813 detects a phase error between the filtered signal and a particular multiple of a fixed frequency. Also, the Loop filter 814 low-pass filters and outputs the phase error to the first NCO 805 for carrier recovery.

In the carrier recovery device according to the second embodiment of the present invention, the two absolute value calculators 809 and 810 are used instead of the two squarers. Except that, the other blocks have the same functions as those of FIG. 6.

If the subtract operation is performed with the absolute values of the two Like Offset QAM signals, the carrier signal component and the components of data blocks are converted to have the frequency corresponding to ¼ of an output frequency of the fixed oscillator. Thus, in the carrier recovery device according to the second embodiment of the present invention, it is possible to recover the carrier even in case the receiving signal has no carrier signal and signal components existing on Nyquist Slope.

As mentioned above, the carrier recovery device according to the preferred embodiments of the present invention has the following advantages.

In the carrier recovery device according to the preferred embodiments of the present invention, it is possible to recover the carrier with the phase error component of the carrier existing on the data block as well as the carrier signal, whereby it has the carrier recovery function even in case the carrier recovery unit is not operated properly.

Also, even in case the receiving signal has no carrier signal and signal component existing on Nyquist Slope, it is possible to recover the carrier, thereby improving efficiency of the digital TV receiver.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A carrier recovery device of a digital television (TV) receiver comprising:
    an analog/digital (A/D) converter converting an analog signal to a digital signal by using a fixed frequency;
    a phase splitter splitting the digital signal to a real signal and a quadrature signal;
    a first complex multiplier outputting a real base band signal i(t) and a quadrature base band signal q(t) by performing a complex multiplying of the real and quadrature signals of a split passband of the phase splitter and a first complex carrier outputted from a first numerically controlled oscillator (NCO);
    a second complex multiplier outputting Like Offset Quadrature Amplitude Modulation (QAM) signals i'(t) and q'(t) by performing a complex multiplying of the real and quadrature base band signals i(t) and q(t) and a second complex carrier outputted from a second NCO;
    first and second squarers receiving the Like Offset QAM signals i'(t) and q'(t), and performing a nonlinear operation;
    a subtractor receiving output signals from the first and second squarers, and performing a subtraction operation;
    a passband filter extracting components corresponding to a carrier frequency from the signals outputted from the subtractor;
    a Gardner phase error detector detecting a phase error between the filtered signal of the passband filter and a particular multiple of a fixed frequency; and
    a loop filter low-pass filtering the phase error, and outputting the filtered phase error to the first NCO.

2. The carrier recovery device as claimed in claim 1, wherein the first complex carrier is proportional to the filtered phase error outputted from the loop filter.

3. The carrier recovery device as claimed in claim 1, wherein the second NCO generates a frequency of the same type as an Offset QAM signal without reception of a control signal from an external.

4. The carrier recovery device as claimed in claim 1, wherein the Like Offset QAM signal is an output signal of the second complex multiplier wherein the fixed frequency is twice a symbol clock frequency.

5. The carrier recovery device as claimed in claim 1, wherein a pilot frequency of the Like Offset QAM signal is located in a frequency band corresponding to ⅛ of the fixed frequency.

6. The carrier recovery device as claimed in claim 1, wherein the first and second squarers respectively output a carrier signal component having a converted frequency corresponding to ¼ of the fixed frequency, and a frequency of a signal in the periphery of the second carrier.

7. A carrier recovery device, comprising:

an analog/digital (A/D) converter converting an analog signal to a digital signal by using a fixed frequency;

a phase splitter splitting the digital signal to a real signal and a quadrature signal;

a first complex multiplier outputting a real base band signal i(t) and a quadrature base band signal q(t) by performing a complex multiplying of the real and quadrature signals of a split passband of the phase splitter and a first complex carrier outputted from a first numerically controlled oscillator (NCO);

a second complex multiplier outputting Like Offset Quadrature Amplitude Modulation (QAM) signals i'(t) and q'(t) by performing a complex multiplying of the real and quadrature base band signals i(t) and g(t) and a second complex carrier outputted from a second NCO;

first and second absolute value calculators receiving the Like Offset QAM signals, i'(t) and q'(t), and calculating absolute values thereof;

a subtracter receiving outputs of the first and second absolute value calculators, and performing a subtraction operation;

a passband filter receiving the signals from the subtractor, and extracting components corresponding to a carrier frequency therefrom;

a Gardner phase error detector detecting a phase error between the filtered signal of passband filter and a particular multiple of a fixed frequency; and a loop filter low-pass filtering the phase error, and outputting the filtered phase error to the first NCO.

8. The carrier recovery device as claimed in claim 7, wherein the first and second absolute value calculators convert a carrier signal component to have a frequency corresponding to ¼ of the fixed frequency.

9. The carrier recovery device as claimed in claim 7, wherein the first complex carrier is proportional to the phase error outputted from the Loop filter.

10. The carrier recovery device as claimed in claim 7, wherein the second NCO generates a frequency of the same type as an Offset QAM signal without reception of a control signal from an external.

11. The carrier recovery device as claimed in claim 7, wherein the Like Offset QAM signal is an output signal of the second complex multiplier wherein the fixed frequency is twice a symbol clock frequency.

12. The carrier recovery device as claimed in claim 7, wherein a pilot frequency of the Like Offset QAM signal is located in a frequency band corresponding to ⅛ of the fixed frequency.

* * * * *